(12) United States Patent
Kameyama et al.

(10) Patent No.: US 8,812,866 B2
(45) Date of Patent: Aug. 19, 2014

(54) METHOD AND APPARATUS FOR STORING DATA

(75) Inventors: Hiroaki Kameyama, Kawasaki (JP); Yuichi Sato, Kawasaki (JP); Shinichi Sazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1283 days.

(21) Appl. No.: 12/068,976

(22) Filed: Feb. 13, 2008

(65) Prior Publication Data

US 2008/0201581 A1 Aug. 21, 2008

(30) Foreign Application Priority Data

Feb. 16, 2007 (JP) ................................. 2007-037183

(51) Int. Cl.
*G06F 11/30* (2006.01)
*G11C 7/00* (2006.01)

(52) U.S. Cl.
USPC ............................................. 713/189; 726/21

(58) Field of Classification Search
USPC .......... 713/189, 161, 169, 170; 726/7, 18, 19, 726/21
See application file for complete search history.

(56) References Cited

U.S. PATENT DOCUMENTS

| | | | |
|---|---|---|---|
| 5,768,389 A | 6/1998 | Ishii | |
| 6,014,443 A * | 1/2000 | Mochizuki et al. | 713/193 |
| 6,445,717 B1 | 9/2002 | Gibson et al. | |
| 6,898,288 B2 * | 5/2005 | Chui | 380/278 |
| 2003/0056118 A1 * | 3/2003 | Troyansky et al. | 713/201 |
| 2003/0097523 A1 * | 5/2003 | Nobuyoshi et al. | 711/112 |
| 2005/0195755 A1 * | 9/2005 | Senta et al. | 370/255 |
| 2007/0253548 A1 * | 11/2007 | Kameyama et al. | 380/28 |
| 2008/0005339 A1 * | 1/2008 | Kwan et al. | 709/229 |
| 2008/0044014 A1 * | 2/2008 | Corndorf | 380/37 |

FOREIGN PATENT DOCUMENTS

| | | |
|---|---|---|
| JP | 5-235979 | 9/1993 |
| JP | 9-50236 | 2/1997 |
| JP | 2003-087236 | 3/2003 |
| JP | 2003-188867 | 7/2003 |
| JP | 2003-288272 | 10/2003 |
| JP | 2003-348065 | 12/2003 |
| JP | 2005-223683 | 8/2005 |
| JP | 2005-293004 | 10/2005 |

OTHER PUBLICATIONS

Korean Office Action issued on Jan. 26, 2010 in corresponding Korean Patent Application 10-2008-0005706.
Korean Office Action dated Jun. 30, 2009, issued in corresponding Korean Patent Application 10-2008-0005706.
Notification of Reason for Refusal issued May 8, 2012 in corresponding Japanese Patent Application No. 2007-037183 (5 pages) 4 pages English Translation).
Hiroaki Kameyama et al. "Information Management System Using Original Secret Information Distribution Technique", Multimedia, Distribution, Cooperation and Mobile (DICOM2006) Symposium Collected Papers (II), Jul. 5, 2006, p. 913-916 (4 pages).

* cited by examiner

*Primary Examiner* — Farid Homayounmehr
*Assistant Examiner* — Abu Sholeman
(74) *Attorney, Agent, or Firm* — Staas & Halsey LLP

(57) ABSTRACT

According to an aspect of an embodiment, a method comprises providing a matrix comprising m rows and n columns, each of the rows and columns comprising elements of zero and one, dividing data into n data blocks, associating each of the data blocks with each of the columns, calculating an exclusive-OR of selected data blocks in reference to one of the rows, the selected data blocks being determined by the element of one in the associated columns in the one of the rows, repeating the calculating in other rows and storing separately the calculated data resulting from the exclusive-OR of data blocks in association with the associated rows, respectively.

11 Claims, 8 Drawing Sheets

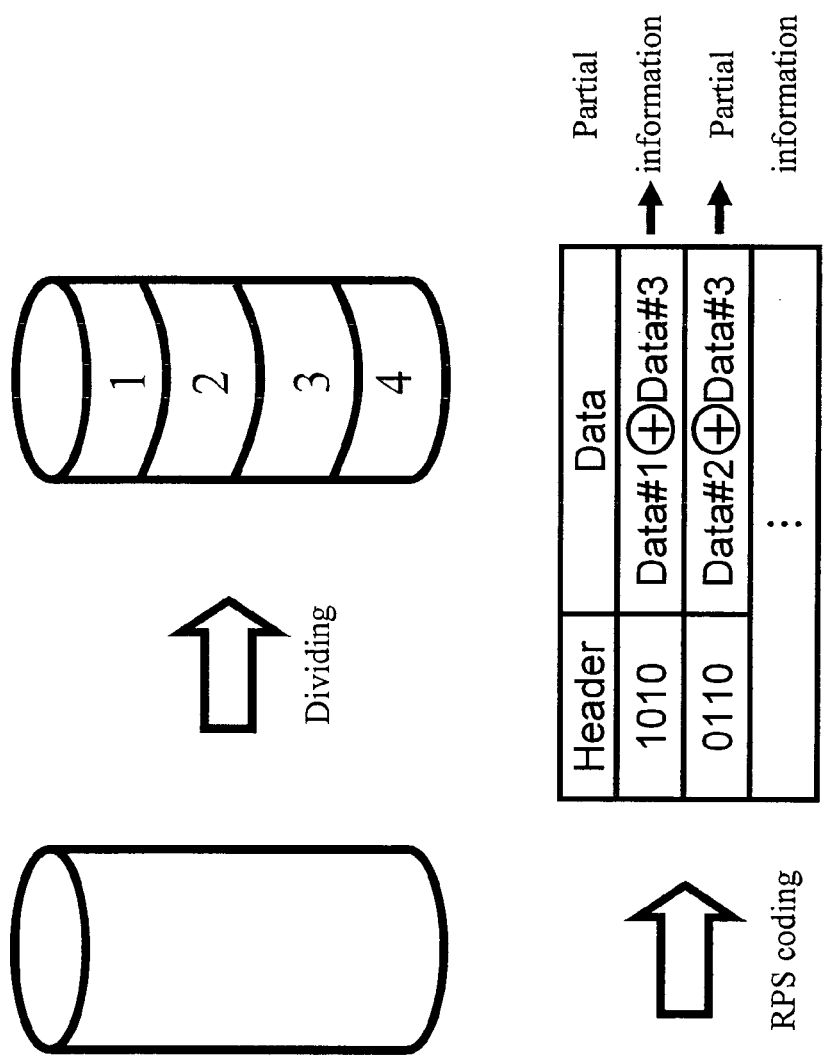

METHOD AND APPARATUS FOR STORING DATA

BACKGROUND OF THE INVENTION

1. Field of the Invention

The present invention relates to an encoding apparatus and method of generating a plurality of partial information blocks used to distribute confidential information and store individual distributed information pieces, and more particularly, to an encoding apparatus and method capable of reducing the amount of arithmetic operations and the amount of each partial information block when confidential information is divided into partial information blocks and the individual information blocks are managed so that the confidential information can be stored safely and flexibly.

2. Description of the Related Art

Examples of the related art are disclosed in Japanese Unexamined Patent Application Publication Nos. 9-50236 and 2003-348065.

SUMMARY

According to an aspect of an embodiment, a method comprises providing a matrix comprising m rows and n columns, each of the rows and columns comprising elements of zero and one, dividing data into n data blocks, associating each of the data blocks with each of the columns, calculating an exclusive-OR of selected data blocks in reference to one of the rows, the selected data blocks being determined by the element of one in the associated columns in the one of the rows, repeating the calculating in other rows and storing separately the calculated data resulting from the exclusive-OR of data blocks in association with the associated rows, respectively.

BRIEF DESCRIPTION OF THE DRAWINGS

FIG. 6 is a diagram illustrating RPS coding in accordance with the first embodiment;

DESCRIPTION OF THE PREFERRED EMBODIMENTS

Figure 1:
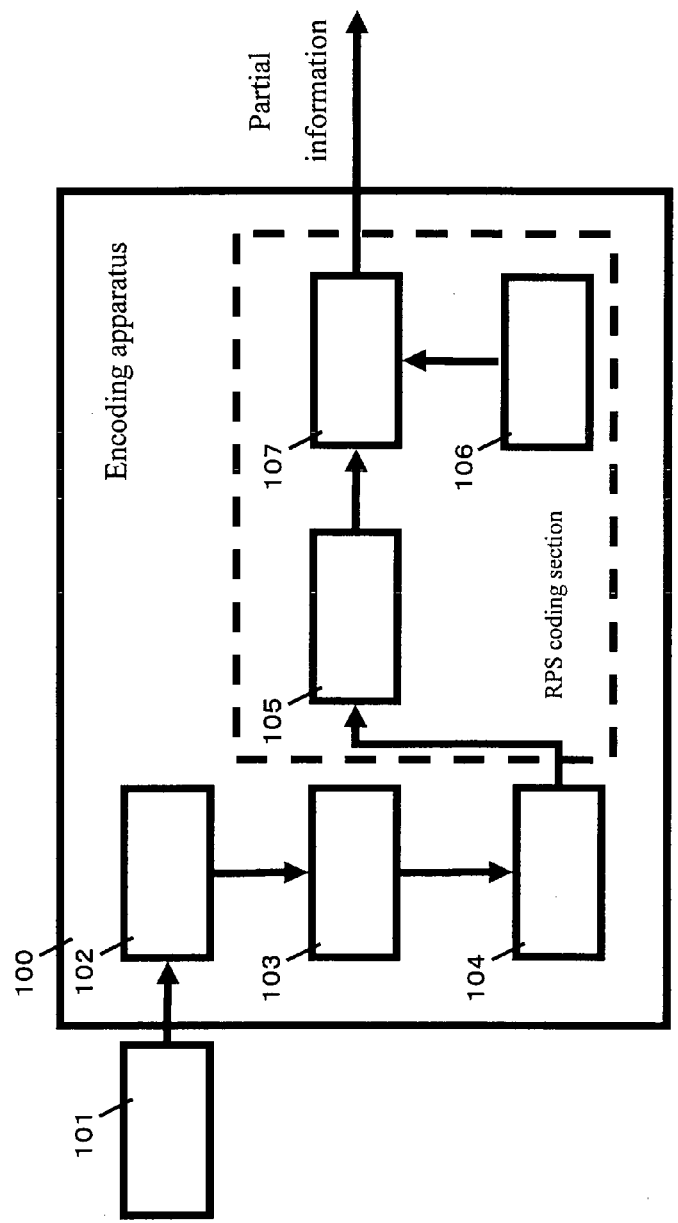
FIG. 1 is a block diagram of the essential part of an encoding apparatus according to a first embodiment.

In some cases, a chip called a security chip is mounted on a computer, such as a notebook computer. The security chip has a unique cryptographic key therein and automatically encrypts data to be stored into a hard disk using the cryptographic key to prevent the stored data from being stolen by a third person or being infected with a virus. It is impossible for an outsider to obtain a cryptographic key in each security chip. If data encrypted using a cryptographic key is removed, the data cannot be decrypted in another computer.

As described above, the security chip provides robust security to a user. Disadvantageously, if the security chip fails, an authorized user may not decrypt data. As a typical measure, a token for reconstructing a cryptographic key in a security chip is generated in an emergency. The token is a file whose data size is small and which can be stored into, for example, a universal serial bus (USB) memory. If a security chip fails, a cryptographic key in the security chip is reconstructed using a token.

Unfortunately, if a token for reconstructing a cryptographic key falls into the hands of a third person while a security chip provides a high degree of safety of data, the cryptographic key in the security chip is reconstructed. Therefore, for example, a token has to be divided into pieces, and after that, the pieces have to be held by a plurality of reliable persons or be distributed to a plurality of computers each including a security chip and be stored therein.

Specifically, according to an approach, conditions needed to reconstruct a secret key are predetermined and partial information blocks obtained by dividing the secret key are distributed to a plurality of persons. To reconstruct the secret key, the secret key is reconstructed from the partial information blocks only when the predetermined reconstruction conditions are satisfied. According to another approach, the secret key is error-correction-encoded using a Reed-Solomon code to generate a plurality of shared keys (partial information blocks) and the generated keys are distributed and stored.

Disadvantageously, in the above-described distributed storage of the keys, the reconstruction of the secret key requires many arithmetic operations. Further, each partial information block having the same data size as that of the original secret key may become a burden on the storage capacity of, for example, a computer that stores the partial information block. In other words, to reconstruct the secret key, it is necessary to solve high-order simultaneous congruences related to a remainder. Each partial information block has the same size as that of the original secret key and the amount of arithmetic operations is increased. The use of a Reed-Solomon code as an error correction code leads to an increase in the amount of arithmetic operations.

In the case where confidential information, such as a token or a key, is divided into partial information blocks and the information blocks are distributed and are stored, the original confidential information cannot be reconstructed unless all of the partial information blocks are collected and used. If only one partial information block is lacked, the confidential information cannot be reconstructed even in an emergency. Accordingly, the above-described approach is inflexible. On the other hand, if the original confidential information can be reconstructed using remarkably few partial information blocks, the safety is not ensured. Therefore, it is desirable that the number of partial information blocks obtained from confidential information and the number of partial information blocks necessary to reconstruct confidential information can be flexibly set.

Embodiments will now be described with reference to the drawings. A case where a token used to reconstruction of a cryptographic key in a security chip is stored will be described below. The embodiments can be applied to another case where a cryptographic key used for encryption of normal data is stored.

First Embodiment

FIG. 1 is a block diagram of the essential part of an encoding apparatus according to a first embodiment. Referring to FIG. 1, the encoding apparatus 100, which is connected to a security chip 101, outputs partial information blocks each containing information related to a token for reconstruction of a cryptographic key used by the security chip 101. Specifically, the encoding apparatus 100 includes a token acquiring unit 102, an encrypting unit 103, a data generating unit 104, a dividing unit 105, an encoding-matrix storing unit 106, and an exclusive-ORing unit 107.

The token acquiring unit 102 acquires a token necessary to reconstruct a cryptographic key used by the security chip 101 upon encrypting and decrypting data. The token acquiring unit 102 may generate a new token in the security chip 101 or acquire a token which has previously been generated and be stored. The token is a file for reconstruction of the cryptographic key in the security chip 101 in, for example, an emergency. The token can be stored into, for example, a USB memory because the token has a relatively small size.

Figure 2:
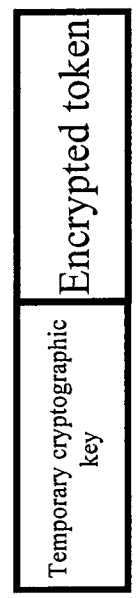
FIG. 2 is a diagram explaining encryption of a token in accordance with the first embodiment.

The encrypting unit 103 encrypts the token acquired by the token acquiring unit 102. Specifically, the encrypting unit 103 encrypts the token using a temporary cryptographic key for temporary use to generate an encrypted token, as shown in FIG. 2. The encrypting unit 103 outputs the encrypted token together with the temporary cryptographic key to the data generating unit 104. In this instance, the temporary cryptographic key used by the encrypting unit 103 is independent of the cryptographic key held in the security chip 101. A new temporary cryptographic key is used each time a token is encrypted.

Figure 3:
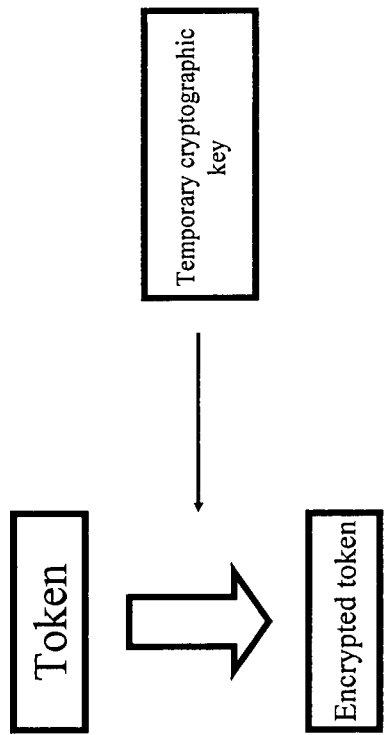
FIG. 3 is a diagram illustrating the structure of data to be encoded in accordance with the first embodiment.

The data generating unit 104 generates data to be encoded from the temporary cryptographic key and the encrypted token. Specifically, the data generating unit 104 combines the temporary cryptographic key with the encrypted token obtained using the temporary cryptographic key to generate data to be encoded, as shown in FIG. 3.

The dividing unit 105 divides the generated data to be encoded into data blocks having the same size. At that time, the dividing unit 105 divides the data into data blocks equal in number to columns of an encoding matrix used for encoding. The dividing unit 105 may add, for example, dummy data to the data to be encoded and then divide the resultant data into data blocks in order to equalize the sizes of the data blocks.

The encoding-matrix storing unit 106 previously stores the encoding matrix used for encoding data to be encoded. Specifically, the encoding-matrix storing unit 106 stores an encoding matrix shown in, for example, FIG. 4.

The encoding matrix has elements of "0" and "1". The elements "0" and "1" are arranged at random such that the orders of elements "0" and "1" in respective rows are different from one another. The number of rows of the encoding matrix corresponds to the number of partial information blocks output by the encoding apparatus 100. The number of columns of the encoding matrix may be set to any value. The larger the number of columns of the encoding matrix, the higher the reconstruction efficiency. In the use of the encoding matrix shown in FIG. 4, the data to be encoded is divided into eight data blocks (i.e., eight indicates the number of columns) and fourteen partial information blocks (fourteen indicates the number of rows) are output. Further, the number of elements "1" in each row is equal to or larger than a value obtained by multiplying the number of columns by a value, which is obtained by subtracting 1 from the degree of redundancy (the ratio of the total amount of partial information blocks to the amount of data to be encoded).

The exclusive-ORing unit 107 reads the encoding matrix from the encoding-matrix storing unit 106 and exclusive-ORs the data blocks in accordance with the positions of the elements "1" in each row of the encoding matrix to generate a partial information block. Specifically, the exclusive-ORing unit 107 assigns a number to each data block generated by the dividing unit 105 and exclusive-ORs the data blocks having the numbers respectively corresponding to the positions of the elements "1" in each row of the encoding matrix. The exclusive-ORing unit 107 generates a partial information block that contains a header portion including elements in each row of the encoding matrix and a data portion including the exclusive-OR obtained in accordance with the row. Consequently, the exclusive-ORing unit 107 generates partial information blocks equal in number to the number of rows of the encoding matrix.

The above-described encoding is called random parity stream (RPS) coding. In the present embodiment, the dividing unit 105, the encoding-matrix storing unit 106, and the exclusive-ORing unit 107 constitute an RPS coding section.

Figures 4, 5:
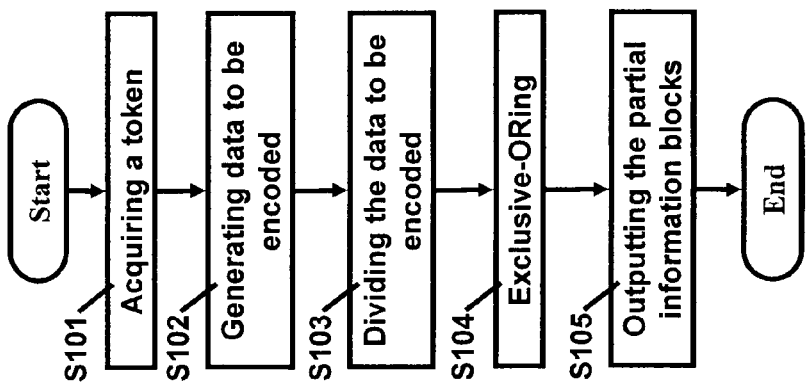
FIG. 4 is a diagram illustrating an encoding matrix in accordance with the first embodiment.
FIG. 5 is a flowchart showing the operation of the encoding apparatus according to the first embodiment.

A token encoding process by the encoding apparatus 100 having the above-described structure will now be described with reference to a flowchart shown in FIG. 5.

In the present embodiment, to reconstruct the cryptographic key used by the security chip 101 in the computer in an emergency, a token for reconstruction of the cryptographic key is generated. The token acquiring unit 102 acquires a token (step S101) and outputs the token to the encrypting unit 103. As described above, the token acquiring unit 102 may generate a new token in the security chip 101 and acquire the generated token. Alternatively, the token acquiring unit 102 may acquire a token previously stored outside the relevant computer.

The encrypting unit 103 encrypts the token output from the token acquiring unit 102 using a temporary cryptographic key. Specifically, the encrypting unit 103 generates a temporary cryptographic key for encryption of the token and encrypts the token using the temporary cryptographic key. The encrypting unit 103 outputs the encrypted token together with the temporary cryptographic key used for encryption to the data generating unit 104. The data generating unit 104 combines the temporary cryptographic key with the encrypted token to generate data to be encoded (step S102).

The dividing unit 105 divides the data to be encoded into data blocks equal in number to columns of an encoding matrix (step S103). For example, in the use of the encoding matrix shown in FIG. 4, the data to be encoded is divided into eight data blocks. The data blocks are output to the exclusive-ORing unit 107. The exclusive-ORing unit 107 reads the encoding matrix from the encoding-matrix storing unit 106 and exclusive-ORs the data blocks corresponding to the elements "1" in each row of the encoding matrix (step S104). For example, as for the uppermost row of the encoding matrix in FIG. 4, the first, second, fifth, and seventh data blocks are exclusive-ORed. The obtained exclusive-OR contains information about the original data blocks.

After that the exclusive-ORing unit 107 obtains the exclusive-ORs in this manner, the exclusive-ORing unit 107 generates partial information blocks each containing the obtained exclusive-OR of the data blocks as a data portion and the row of the matrix encoding related to the exclusive-OR as a header portion, and outputs the partial information blocks (step S105). Therefore, the exclusive-ORing unit 107 outputs the partial information blocks equal in number to the rows of the encoding matrix. The output partial information blocks are distributed to a plurality of reliable persons and are stored by them. Each partial information block may be stored into at least one hard disk and/or at least one removable medium, such as a flash memory. Alternatively, each partial information block may be stored into a storage connected via a network. Further, the partial information blocks may be shared between computers each having another security chip. In this case, the partial information blocks may be encrypted by the other security chip in each computer, thus further improving safety measures.

A concrete example of the RPS coding according to the present embodiment will now be described with reference to FIG. 6. In the following description, it is assumed that an encoding matrix has four columns.

The data generating unit 104 generates data to be encoded, the data containing a temporary cryptographic key and an encrypted token. The dividing unit 105 divides the data to be encoded. Since the dividing unit 105 divides the data into data blocks equal in number to the columns of the encoding matrix stored in the encoding-matrix storing unit 106, the data is divided into four data blocks as shown in FIG. 6.

The data blocks are output to the exclusive-ORing unit 107. The exclusive-ORing unit 107 exclusive-ORs the data blocks according to the encoding matrix to perform the RPS coding. For example, when the uppermost row of the encoding matrix is "1010" as shown in FIG. 6, the first and third data blocks are exclusive-ORed and a partial information block is generated such that "1010", serving as a header portion, is added to the obtained exclusive-OR. When the second row from the top of the encoding matrix is "0110", the second and third data blocks are exclusive-ORed and a partial information block is generated such that "0110", serving as a header portion, is added to the obtained exclusive-OR.

As described above, in the RPS coding, the data blocks are exclusive-ORed, thus encoding the data. Advantageously, therefore, the amount of arithmetic operations is not so large and the amount of each partial information block is substantially the same as that obtained by adding the amount of a header portion to the amount of one data block, which is obtained by dividing the data to be encoded. Consequently, both of the amount of arithmetic operations and the amount of data can be reduced. Furthermore, the number of partial information blocks and the amount of data can be flexibly set by adjusting the number of columns and that of rows of the encoding matrix and the positions of the elements "1".

In decoding the encoded data, i.e., to obtain the original data from the partial information blocks obtained by RPS coding, the partial information blocks of at least the same number as the columns of the encoding matrix are collected and are arranged vertically. The matrix composed of the header portions of the respective partial information blocks are transformed into a unit matrix using the Gauss elimination method. In the transformation into the unit matrix, each data portion is converted into data blocks obtained by dividing the original data to be encoded. The data blocks are combined into the original data to be encoded. Since the original data contains a temporary cryptographic key and an encrypted token, the encrypted token is decrypted using the temporary cryptographic key, thus obtaining the token for reconstruction of the cryptographic key in the security chip 101.

As described above, according to the present embodiment, a token is encrypted using a temporary cryptographic key to generate data to be encoded, the data is divided into data blocks equal in number to columns of an encoding matrix, and the exclusive-OR in each row of the encoding matrix is obtained using the data blocks to encode the data, so that partial information blocks containing the encoding matrix and the exclusive-ORs are output. Therefore, the generation of the partial information blocks requires only dividing the original data to be encoded into the data blocks and exclusive-ORing the data blocks. The amount of each partial information block is substantially the same as that of each data block obtained by dividing the original data. Consequently, when confidential information is divided into partial information blocks and the partial information blocks are distributed and are managed, the amount of arithmetic operations and the amount of each partial information block can be reduced and the confidential information can be stored safely and flexibly.

Second Embodiment

According to a feature of a second embodiment, partial information blocks are distributed to a plurality of computers that use the same groupware.

Figure 7:
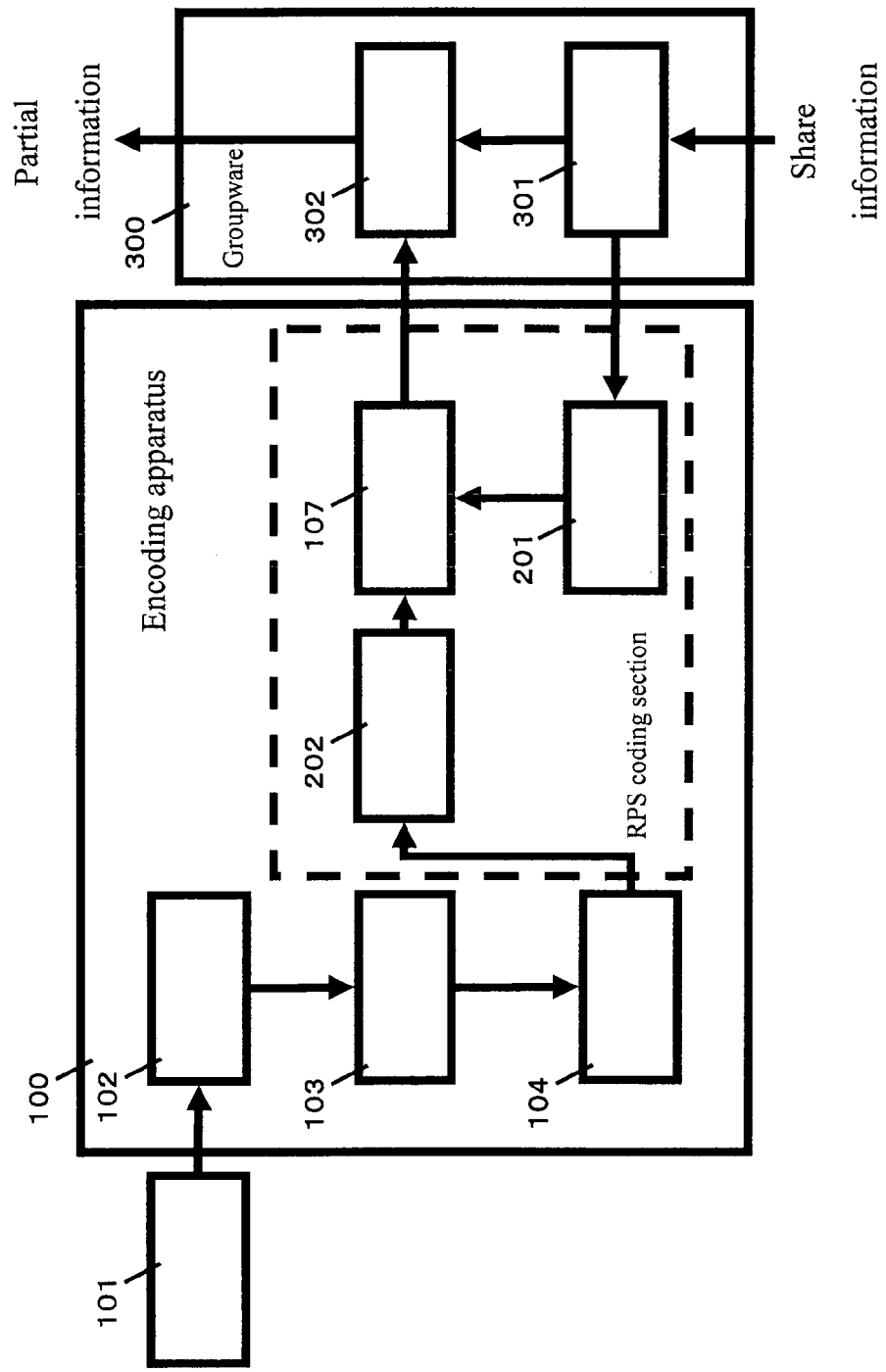
FIG. 7 is a block diagram of the essential part of an encoding apparatus according to a second embodiment.

FIG. 7 is a block diagram showing the essential part of an encoding apparatus according to the present embodiment. In FIG. 7, the same components as those in FIG. 1 are designated by the same reference numerals and a description of the previously described components is omitted. Referring to FIG. 7, the encoding apparatus 100, which is connected to a security chip 101, outputs partial information blocks to groupware 300. The partial information blocks each contain information about a token for reconstruction of a cryptographic key used by the security chip 101. Specifically, the encoding apparatus 100 includes a token acquiring unit 102, an encrypting unit 103, a data generating unit 104, an encoding-matrix generating unit 201, a dividing unit 202, and an exclusive-ORing unit 107.

The encoding-matrix generating unit 201 generates an encoding matrix in accordance with information indicating the distribution proportions of partial information blocks for computers, the information being sent from the groupware 300. In other words, the encoding-matrix generating unit 201 determines the number of columns of the encoding matrix according to the amount of each partial information block and also determines the number of rows of the encoding matrix according to the number of partial information blocks to be distributed. Specifically, the encoding-matrix generating unit 201 determines the amount of each data block on the basis of the amount of each partial information block indicated by information sent from the groupware 300, divides the amount of data to be encoded by the amount of each data block to obtain the division number, and uses the division number as the number of columns of the encoding matrix. In addition, the encoding-matrix generating unit 201 uses the total number of partial information blocks, indicated by information sent from the groupware 300, as the number of rows of the encoding matrix. After the determination of the number of columns and that of rows of the encoding matrix, the encoding-matrix generating unit 201 arranges elements "1" at random and transmits information indicating the number of columns to the dividing unit 202.

When receiving the information indicating the number of columns of the encoding matrix from the encoding-matrix generating unit 201, the dividing unit 202 divides data to be encoded, generated by the data generating unit 104, into data blocks equal in number to the columns of the encoding matrix.

In the present embodiment, the encoding-matrix generating unit 201, the dividing unit 202, and the exclusive-ORing unit 107 constitute an RPS coding section.

Again referring to FIG. 7, the groupware 300 includes a distribution-proportion determining unit 301 and a partial-information distributing unit 302.

Figure 9:
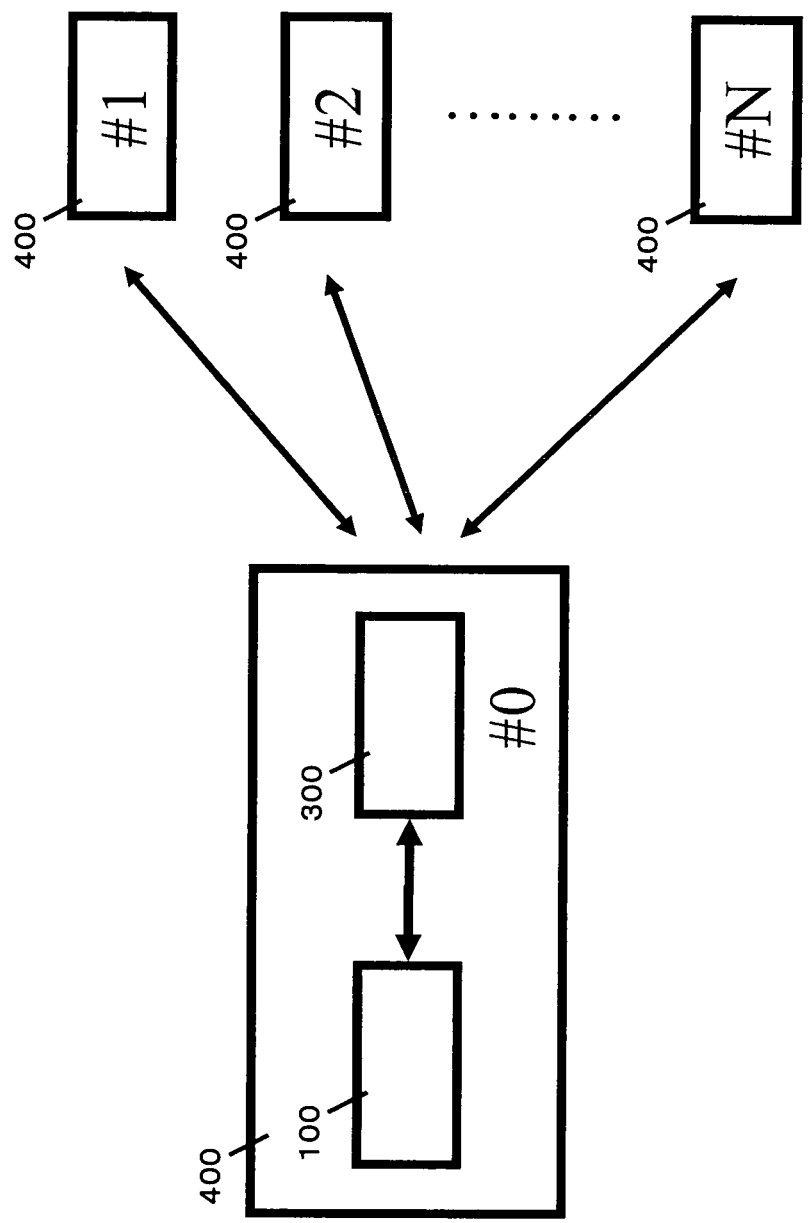
FIG. 9 is a diagram illustrating arrangement of the encoding apparatus, groupware, and computers in accordance with the second embodiment.

The distribution-proportion determining unit 301 acquires share information blocks from computers 400 which use the groupware 300. Each share information block indicates the amount of data, serving as a partial information block, storable in the corresponding computer 400. After that, the distribution-proportion determining unit 301 determines the numbers of partial information blocks to be stored into the respective computers. Specifically, the distribution-proportion determining unit 301 determines a minimum value of the amount of storable data on the basis of the share information blocks sent from the respective computers 400 and sets the determined minimum value to the amount of each partial information block. The distribution-proportion determining unit 301 determines the number of partial information blocks to be stored in each computer 400 on the basis of the share information block sent from the computer 400. The distribution-proportion determining unit 301 then transmits information indicating the determined numbers for the respective computers 400 to the partial-information distributing unit 302. In addition, the distribution-proportion determining unit 301 transmits the information indicating the amount of each partial information block and information indicating the total number of partial information blocks to be distributed to the computers to the encoding-matrix generating unit 201. FIG. 9 shows arrangement of the encoding apparatus 100, the groupware 300, and the computers 400. The encoding apparatus 100 and the groupware 300 constitute a computer 400 (#0). The computer 400 (#0) is connected to, for example, N computers 400 (#1) to (#N). In this case, N indicates an arbitrary integer. The computers 400 (#1) to (#N) each include the encoding apparatus 100 and the groupware 300. With this arrangement, each computer can store divided data blocks sent from the other computers.

The partial-information distributing unit 302 distributes partial information blocks, output from the exclusive-ORing unit 107, to the respective computers in accordance with the numbers of partial information blocks for the respective computers 400 indicated by the information transmitted from the distribution-proportion determining unit 301.

Figure 8:
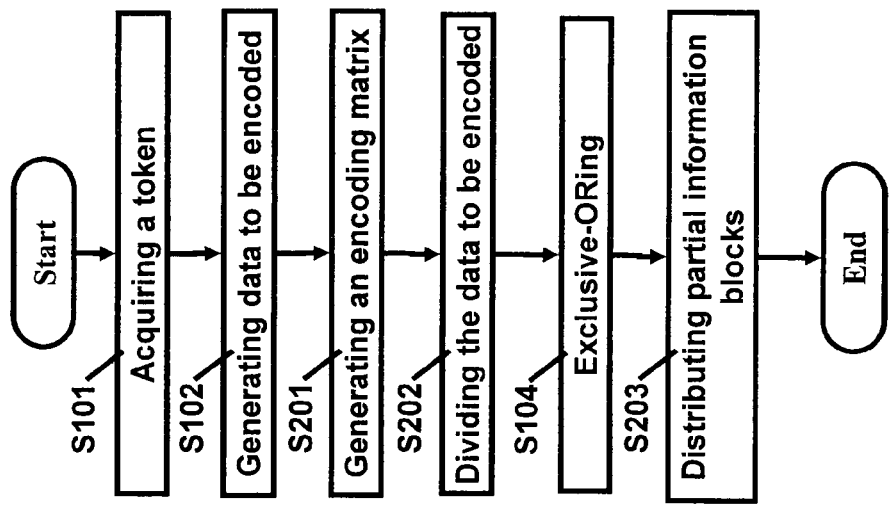
FIG. 8 is a flowchart of the operation of the encoding apparatus according to the second embodiment.

A token encoding process by the encoding apparatus with the above-described structure will now be described with reference to a flowchart of FIG. 8. In FIG. 8, the same steps as those in FIG. 5 are designated by the same reference numerals.

According to the present embodiment, to reconstruct a cryptographic key used by the security chip 101 in any computer in an emergency, a token for reconstruction of the cryptographic key is generated in a manner similar to the first embodiment. The token acquiring unit 102 acquires a token (step S101) and outputs the token to the encrypting unit 103. The token acquiring unit 102 may generate a new token in the security chip 101 and acquire the generated token. Alternatively, the token acquiring unit 102 may acquire a token previously stored outside the computer.

The encrypting unit 103 encrypts the token output from the token acquiring unit 102 using a temporary cryptographic key. Specifically, the encrypting unit 103 generates a temporary cryptographic key for encryption of the token and encrypts the token using the temporary cryptographic key. The encrypting unit 103 outputs the encrypted token together with the temporary cryptographic key used for encryption to the data generating unit 104. The data generating unit 104 combines the temporary cryptographic key with the encrypted token to generate data to be encoded (step S102).

In the groupware connected to the computers, the distribution-proportion determining unit 301 collects share information blocks from the respective computers, each share information block indicating the amount of data that can be stored as a partial information block in the corresponding computer.

The distribution-proportion determining unit 301 then determines a minimum value of the amount of data as the amount of each partial information block on the basis of the share information blocks. The distribution-proportion determining unit 301 transmits information indicating the amount of each partial information block and information indicating the total number of partial information blocks to be stored in the respective computers to the encoding-matrix generating unit 201. The encoding-matrix generating unit 201 generates an encoding matrix on the basis of the amount of each partial information block and the total number of partial information blocks (step S201).

In other words, the encoding-matrix generating unit 201 determines the amount of each data block in accordance with the amount of each partial information block and divides the amount of the data to be encoded by the amount of each data block, thus obtaining the number of data blocks obtained from the data to be encoded. The number of data blocks is used as the number of columns of the encoding matrix. The encoding-matrix generating unit 201 transmits information indicating the number of columns to the dividing unit 202. Further, the encoding-matrix generating unit 201 sets the total number of partial information blocks to the number of rows of the encoding matrix and arranges elements "1" at random to generate the encoding matrix.

When receiving the information indicating the number of columns of the encoding matrix, the dividing unit 202 divides the data to be encoded into data blocks equal in number to the columns of the encoding matrix (step S202). The dividing unit 202 outputs the data blocks to the exclusive-ORing unit 107. The exclusive-ORing unit 107 reads the encoding matrix from the encoding-matrix generating unit 201 and exclusive-ORs the data blocks corresponding to the elements "1" in each row of the encoding matrix (step S104).

After that the exclusive-ORing unit 107 obtains the exclusive-ORs of the data blocks in this manner, the exclusive-ORing unit 107 generates partial information blocks each containing the obtained exclusive-OR as a data portion and the row of the matrix encoding related to the exclusive-OR as a header portion, and outputs the partial information blocks to the partial-information distributing unit 302. Therefore, the exclusive-ORing unit 107 outputs the partial information blocks equal in number to the rows of the encoding matrix. Since the number of rows of the encoding matrix is the same number as the total number of partial information blocks determined on the basis of the share information blocks collected from the respective computers as described above, those partial information blocks are distributed to the respective computers in accordance with the share information blocks (step S203). In other words, the distribution-proportion determining unit 301 determines the numbers of partial information blocks to be distributed to the respective computers on the basis of the determined amount of each partial information block and the share information blocks of the respective computers, and transmits information indicating the distribution proportions for the respective computers to the partial-information distributing unit 302. The partial-information distributing unit 302 distributes the partial information blocks, output from the exclusive-ORing unit 107, to the respective computers in accordance with the distribution proportions for the respective computers. And the partial-information, calculated data resulting form an exclusive-OR of data blocks in association with associated rows is stored separately.

As described above, according to the present embodiment, share information blocks are collected from a plurality of computers that use the same groupware and the amount of each partial information block and the distribution proportions of partial information blocks for the respective computers are determined on the basis of the share information blocks. An encoding matrix is generated in accordance with the amount of each partial information block and the total number of partial information blocks. Data to be encoded is encoded using the generated encoding matrix. Obtained partial information blocks are distributed to the respective computers in accordance with the distribution proportions determined on the basis of the share information blocks. Consequently, the encoding matrix can be flexibly generated in accordance with the amounts of storable data in the computers which use the same groupware and the partial information blocks can be distributed according to the storage capacities of the respective computers.

In decoding encoded data, i.e., to obtain original data from partial information blocks obtained by RPS coding, the partial information blocks of at least the same number as the columns of the encoding matrix may be collected from the computers. A description of the decoding method is omitted because the decoding method is the same as that described in the first embodiment.

In the above-described embodiments, the encoding apparatus is connected to the security chip 101. The encoding apparatus according to each embodiment may be connected to a hard disk or a removable medium which stores a cryptographic key for encryption of, for example, normal data to perform RPS coding on the normal cryptographic key.

The processes by the encoding apparatus described in each embodiment can be realized by allowing an information processing apparatus to execute a program prepared. An example of the information processing apparatus for executing a program for realization of various processes will now be described with reference to FIG. 10.

Figure 10:
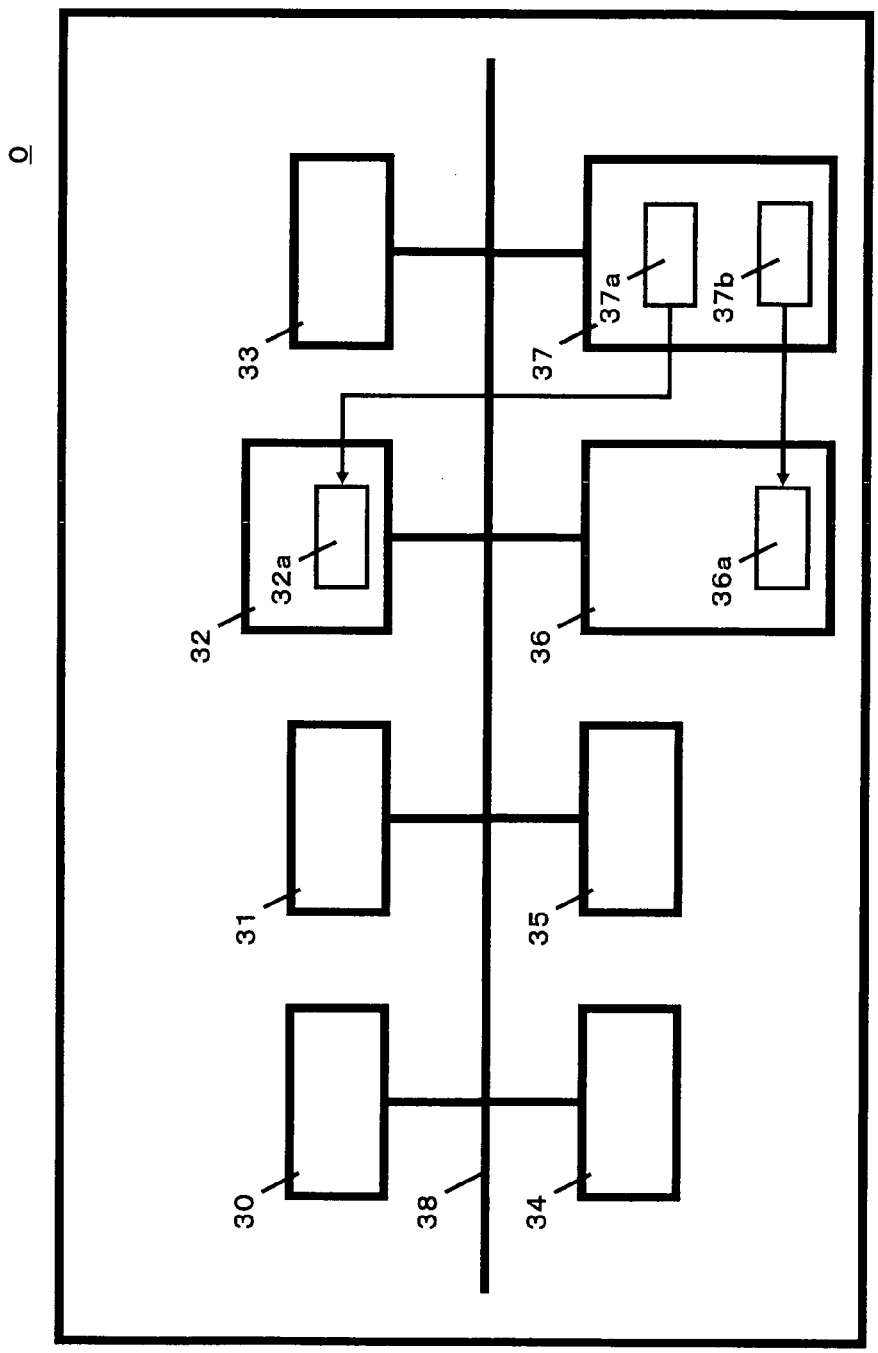
FIG. 10 is a diagram illustrating the hardware configuration of a computer, serving as an encoding apparatus.

FIG. 10 is a diagram illustrating the hardware configuration of an information processing apparatus 0, serving as an encoding apparatus. The information processing apparatus 0 includes an input device 30 for receiving data input by a user, a monitor 31, a random access memory (RAM) 32, a read only memory (ROM) 33, a reader 34 for reading a program from a recording medium which stores various programs, a network interface 35 for transmitting and receiving data to/from another information processing apparatus via a network, a central processing unit (CPU) 36, and a magnetic disk unit, such as a hard disk drive (HDD) 37, the components 30 to 37 connecting to a bus 38.

When the information processing apparatus 0 functions as an encoding apparatus, the HDD 37 stores various programs 37b for providing functions similar to those of the encoding apparatuses. The CPU 36 reads the various programs 37b from the HDD 37 into the RAM 32 and executes the various programs 37b, thus starting various processes 36a for realizing the above-described functions of the encoding apparatuses. The various processes 36a correspond to the token acquiring unit 102, the encrypting unit 103, the data generating unit 104, the dividing unit 105, the encoding-matrix storing unit 106, and the exclusive-ORing unit 107 in FIG. 1 and also correspond to the encoding-matrix generating unit 201 and the dividing unit 202 in FIG. 7.

The HDD 37 stores various data blocks 32a corresponding to data blocks stored in a memory unit of each of the above-described encoding apparatuses. The CPU 36 stores the various data blocks 32a into the HDD 37, reads the various data blocks 32a from the HDD 37 into the RAM 32, and executes data processing on the basis of the various data blocks 32a stored in the RAM 32.

It is unnecessary to store the various programs 37b into the HDD 37 from the beginning. For example, the various programs 37b may be stored into a portable physical medium, such as a flexible disk (FD), a compact disk read only memory (CD-ROM), a digital versatile disk (DVD), a magneto-optical disk, or an IC card which is loaded into the information processing apparatus 0, a fixed physical medium, such as a hard disk drive (HDD) disposed inside or outside the information processing apparatus, and/or another information processing apparatus (or a server) connected to the information processing apparatus 0 via a public circuit, the Internet, a local area network (LAN), or a wide area network (WAN). The information processing apparatus 0 may read the various programs 37b from the storing medium or apparatus and executes the programs.

The encoding apparatus 100 may be constructed as hardware including the token acquiring unit 102, the encrypting unit 103, the data generating unit 104, the dividing unit 105, the encoding-matrix storing unit 106, the exclusive-ORing unit 107, the encoding-matrix generating unit 201, and the dividing unit 202.

The above-described embodiments can be applied to a case where confidential information is divided into partial information blocks and the information blocks are managed to reduce the amount of arithmetic operations and the amount of each partial information block and store the confidential information safely and flexibly.

What is claimed is:

1. A method of controlling an apparatus having a computer processor, the method comprising:
storing a matrix comprising m number of rows and n number of columns, the rows and columns comprising elements of zero and one;
encrypting data by a cryptographic key;
generating combined data by combining the encrypted data and the cryptographic key;
dividing the combined data into the n number of data blocks;
associating the n number of data blocks with the n number of columns;
calculating an exclusive-OR of selected data blocks in reference to one of the rows, the selected data blocks being determined by a one element in the associated columns in the one row, using the computer processor;
repeating the calculating in other rows; and
storing separately the calculated data resulting from the exclusive-OR of data blocks in association with the rows as partial information blocks, respectively,
wherein a number of one elements in the n number of columns is equal to or larger than a first value determined according to a degree of redundancy as a ratio of amount of total data of the partial information blocks to amount of data to be encrypted.

2. The method of claim 1, wherein the storing stores the matrix on the basis of a capacity of a storage for storing the exclusive-OR of data blocks in association with the associated rows.

3. The method of claim 1, wherein the n number of columns is determined on the basis of a minimum capacity of a plurality of storages for storing the exclusive-OR of data blocks in association with the associated rows and a size of the exclusive-OR of data blocks in association with the associated rows.

4. The method of claim 3, wherein the m number of rows is determined on the basis of a total number of the exclusive-OR of data blocks in association with the associated rows being stored in the storages.

5. The method of claim 1, wherein the calculated data is capable of reconstructing a cryptographic key.

6. An apparatus comprising:

a storage for storing a matrix comprising m number of rows and n number of columns, the rows and columns comprising elements of zero and one; and a hardware processor for encrypting data by a cryptographic key, for generating combined data by combining the encrypted data and the cryptographic key, for dividing the combined data into the n number of data blocks, associating the n number of data blocks with the number of columns, calculating an exclusive-OR of selected data blocks in reference to one of the rows, the selected data blocks being determined by a one element in the associated columns in the one row, repeating the calculating in other rows and storing separately the calculated data resulting from the exclusive-OR of data blocks in association with the rows as partial information blocks, respectively, wherein a number of one elements in the n number of columns is equal to or larger than a first value determined according to a degree of redundancy as a ratio of amount of total data of the partial information blocks to amount of data to be encrypted.

7. The apparatus of claim 6, wherein the matrix is determined on the basis of a capacity of a storage for storing the exclusive-OR of data blocks in association with the associated rows.

8. The apparatus of claim 6, wherein the n number of columns is determined on the basis of a minimum capacity of a plurality of storages for storing the exclusive-OR of data blocks in association with the associated rows and a size of the exclusive-OR of data blocks in association with the associated rows.

9. The apparatus of claim 8, wherein the m number of rows is determined on the basis of a total number of the exclusive-OR of data blocks in association with the associated rows being stored in each of the storages.

10. The apparatus of claim 6, wherein the calculated data is capable of reconstructing a cryptographic key.

11. The method according to claim 1, wherein each of the rows is different from one another, wherein the first value is obtained by multiplying the n number of columns by a second value, wherein the second value is obtained by subtracting one from the degree of redundancy, and the method further comprising generating m number of partial information blocks that include a header portion including elements in the rows and a data portion including the exclusive-OR data obtained in accordance with the rows.

* * * * *